(12) United States Patent
Yamaguchi et al.

(10) Patent No.: US 7,349,019 B2
(45) Date of Patent: Mar. 25, 2008

(54) SOLID-STATE IMAGING DEVICE, CAMERA, POWER SUPPLY DEVICE AND METHOD THEREOF

(75) Inventors: Takumi Yamaguchi, Kyoto (JP); Takahiko Murata, Osaka (JP); Shigetaka Kasuga, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 719 days.

(21) Appl. No.: 10/901,120

(22) Filed: Jul. 29, 2004

(65) Prior Publication Data

US 2005/0024525 A1 Feb. 3, 2005

(30) Foreign Application Priority Data

Jul. 30, 2003 (JP) ............................. 2003-282983

(51) Int. Cl.
H04N 3/14 (2006.01)
(52) U.S. Cl. ........................................ 348/308; 348/372
(58) Field of Classification Search ................ 348/308, 348/302, 372, 208.99, 332, 333.13, 257, 348/294, 304, 227.1; 257/431, 461, 462, 257/219–234, 414–425, 444; 250/208.1, 250/370.11
See application file for complete search history.

(56) References Cited

U.S. PATENT DOCUMENTS

| | | | |
|---|---|---|---|
| 5,907,357 A | 5/1999 | Maki | |
| 6,947,087 B2 * | 9/2005 | Egawa et al. | 348/304 |
| 6,952,015 B2 * | 10/2005 | Kameshima | 250/370.11 |
| 7,102,677 B2 | 9/2006 | Wantanabe | |
| 7,113,214 B2 * | 9/2006 | Tanaka | 348/308 |
| 7,224,390 B2 * | 5/2007 | Kokubun et al. | 348/308 |
| 7,271,835 B2 * | 9/2007 | Iizuka et al. | 348/314 |
| 2001/0013899 A1 | 8/2001 | Wantanabe | |

FOREIGN PATENT DOCUMENTS

| | | |
|---|---|---|
| JP | 08-264757 | 10/1996 |
| JP | 09-36723 | 2/1997 |
| JP | 10-032325 | 2/1998 |
| JP | 2000-101936 | 4/2000 |
| JP | 2001-309243 | 11/2001 |
| JP | 2003-046864 | 2/2003 |

* cited by examiner

Primary Examiner—Jefferey F. Harold
Assistant Examiner—Cynthia Calderon
(74) Attorney, Agent, or Firm—Wenderoth, Lind & Ponack, L.L.P.

(57) ABSTRACT

With the use of the MOS-type solid-state imaging device, it is possible, by extending the period during which the VDD voltage rises from Low level to High level, that the gate voltage of the resetting unit does not fluctuate to have a positive electric potential due to the coupling capacitance between the VDD power and the gate of the resetting unit, unlike the conventional case. Consequently, the electrons necessary for rendering the accumulation unit non-selectable do not flow from the accumulation unit to the VDD power. This prevents the level of the electric potential in the accumulation unit of non-selectable row from becoming positive. Also, the detecting unit is not switched on, which prevents the error of selecting a non-selectable row.

15 Claims, 13 Drawing Sheets

SOLID-STATE IMAGING DEVICE, CAMERA, POWER SUPPLY DEVICE AND METHOD THEREOF

BACKGROUND OF THE INVENTION (1) Field of the Invention

The present invention relates to a MOS-type solid-state imaging device used for a digital camera or the like.

(2) Description of the Related Art

Various kinds of MOS-type solid-state imaging devices have been suggested in the past (see reference to Japanese Laid-Open Publication No. 2003-046864).

Figure 1:
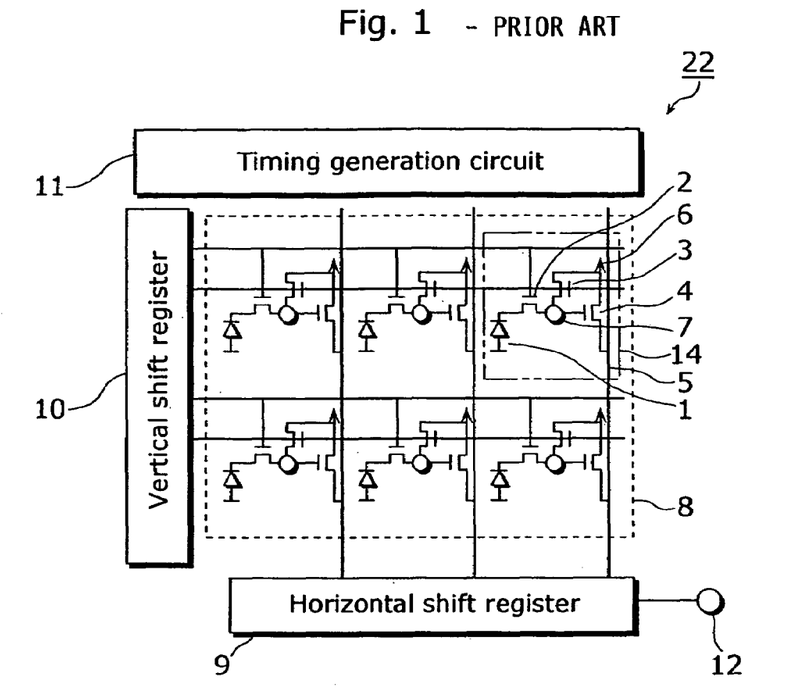
FIG. 1 shows a structural example of the conventional solid-state imaging device made up of MOS transistors.

FIG. 1 is a diagram showing the structural example of the conventional solid-state imaging device that is made up of MOS transistors. The solid-state imaging device 22 is formed on a semiconductor substrate and is comprised of the following: a photodiode unit (to be referred to as "PD unit" hereinafter) 1 for performing photoelectric conversion on an incident light; a read transistor 2 for reading out a signal charge obtained by the PD unit 1; a floating diffusion unit (to be referred to as "FD unit" hereinafter) 7 for accumulating the signal charge read out by the read transistor 2; a detecting transistor 4 for detecting the signal charge accumulated by the FD unit 7; a reset transistor 3 for resetting the signal charge accumulated by the FD unit 7; and an imaging area 8 (an area indicated by a dashed line in FIG. 1) where amplifier-type unit pixels, each having a vertical signal line 5 and a VDD power 6, are bi-dimensionally arranged. Here, the area indicated by a two-dotted chain line in FIG. 1 is "a pixel unit" (also referred to as "unit pixel") 14 composing a circuit having one pixel as a unit.

The solid-state imaging device 22 is further comprised of: a horizontal shift register 9 for selecting a column of pixels by use of the vertical signal line 5; a vertical shift register 10 for selecting a row of pixels using the vertical signal line 5; a timing generation circuit 11 for providing a pulse necessary for a drive; and an output amplifier 12.

Figure 2:
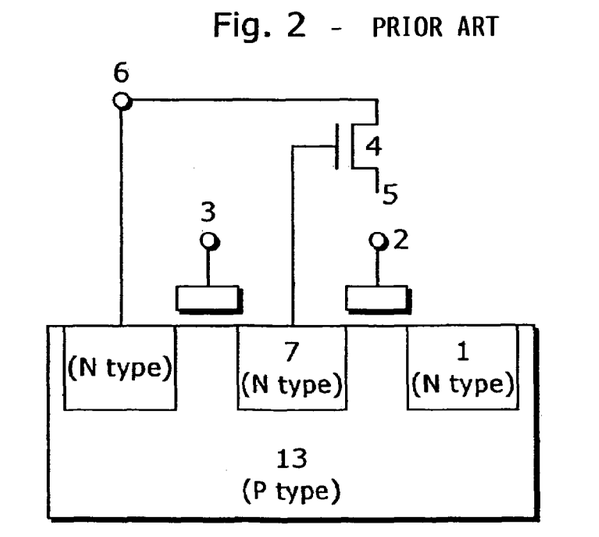
FIG. 2 is a pattern diagram including the cross section of the pixel unit in the conventional solid-state imaging device.

FIG. 2 is a pattern diagram which includes the cross section of the pixel unit 14 shown in FIG. 1. In FIG. 2, the PD unit 1, the VDD power 6 and the FD unit 7 are made of n-type semiconductors and are formed on a well layer 13 made of p-type semiconductor. The gate of the read transistor 2 and that of the reset transistor 3 are poly-silicon electrodes. It should be noted that the cross section of the detecting transistor 4 is not shown in FIG. 2, but the source and drain of the detecting transistor 4 are made of n-type semiconductors and the gate is a poly-silicon electrode. The VDD power 6 is connected to the drain of the detecting transistor 4 and the drain of the reset transistor 3.

Figure 3:
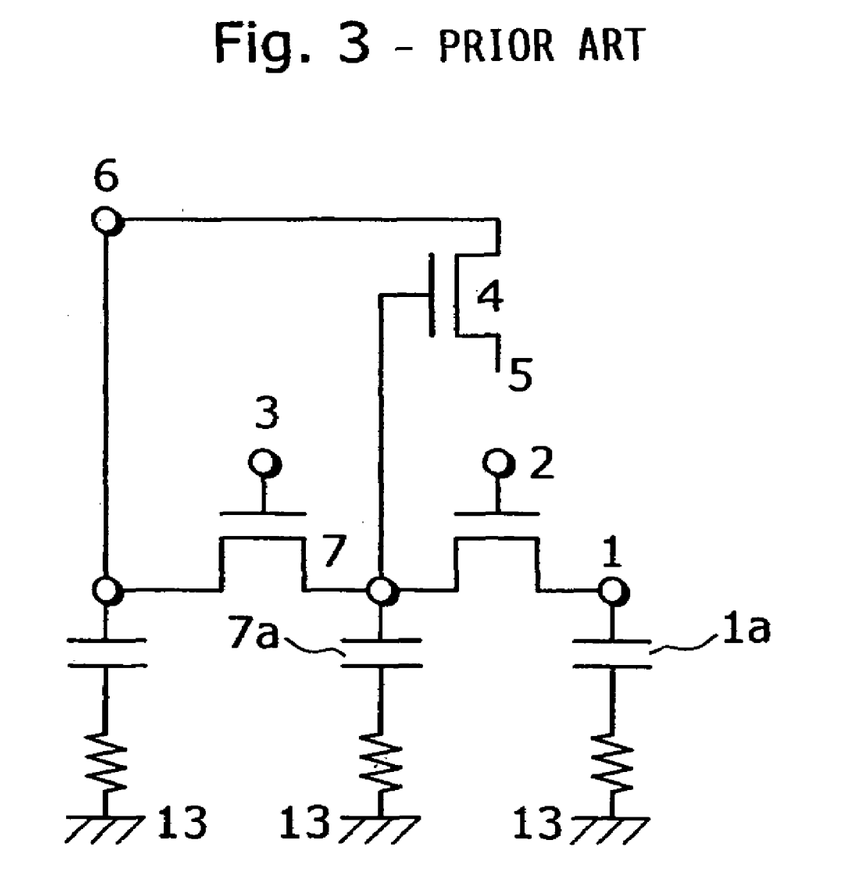
FIG. 3 is a circuit diagram showing each of the elements in the conventional solid-state imaging device.

FIG. 3 is a circuit diagram illustrating each of the elements shown in FIG. 2. The signal charge on which photoelectric conversion is performed by the PD unit 1 is accumulated by the PN junction capacitance $1a$ in the PD unit 1, and then, read out by the PN junction capacitance $7a$ in the FD unit 7 allowed by the read transistor 2. The electric potential of the FD unit 7, being mainly made up of PN junction capacitances, is determined according to the amount of the charges that are read out and the gate voltage of the detecting transistor 4 changes accordingly. As a result, a signal is retrieved as a change in the electric potential of the vertical signal line 5.

Figure 4:
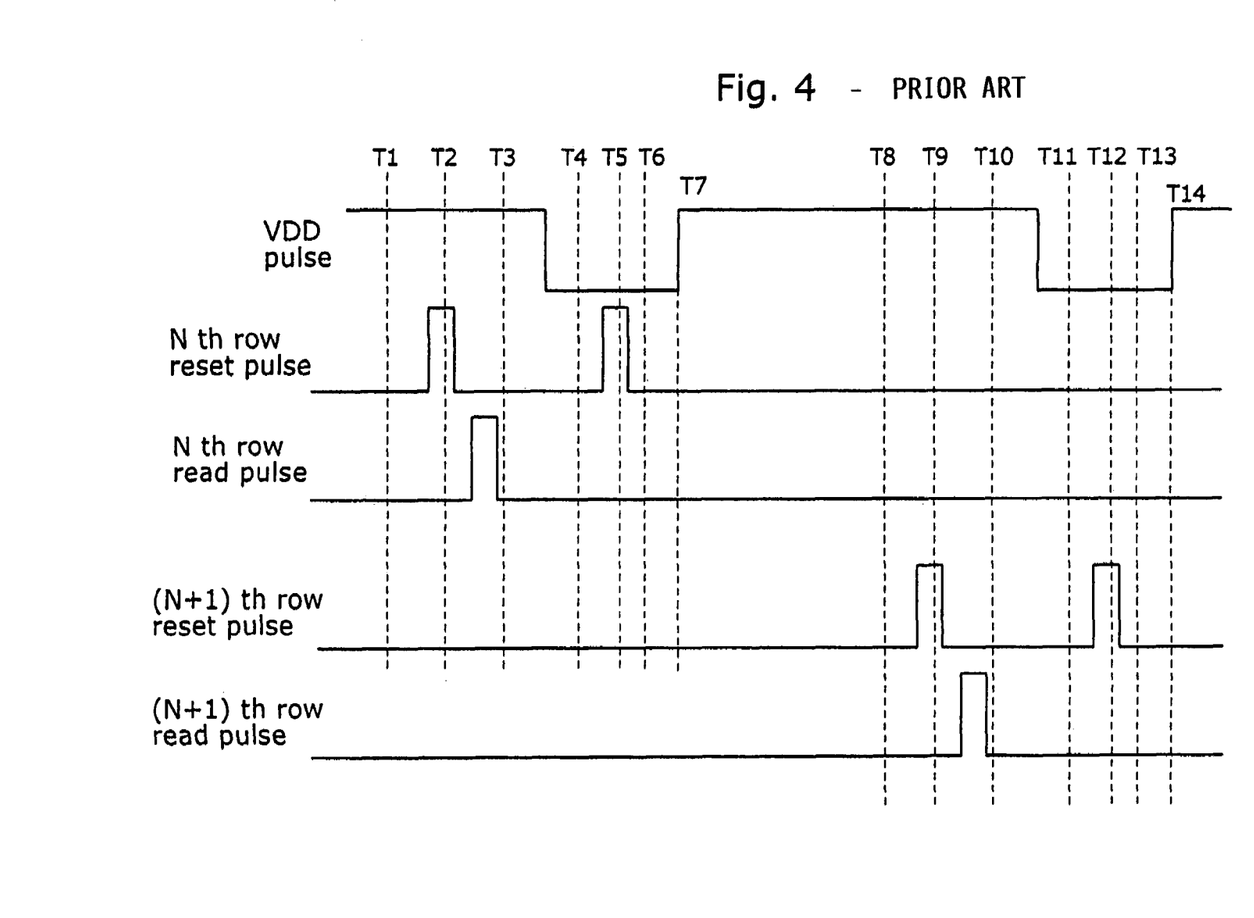
FIG. 4 is a diagram showing the drive timing of the pixel unit in the conventional solid-state imaging device; T7 at each part of the pixel unit in the conventional solid-state imaging device.

FIG. 4 is a diagram showing the drive timing of the conventional pixel unit 14. FIG. 4 shows how a voltage pulse of the VDD power 6 (to be referred to as "VDD pulse" hereinafter), a reset pulse of the N th row reset transistor 3 (to be referred to as "N th row reset pulse"), and a read pulse of the N th row read transistor 2 (to be referred to as "N th row read pulse"), and a reset pulse of (N+1) th reset transistor (to be referred to as "(N+1) th row reset pulse") and a read pulse of (N+1) th row read transistor (to be referred to as "(N+1) th row read pulse") respectively changes with time at the time of operating N th and (N+1) th rows.

FIGS. 5A-5G show the electric potential at the time T1 through T7 at each of the units in the pixel unit 14, corresponding to FIG. 4. It should be noted that the vertical line in FIG. 5A-5G show an upper level as "Low level" and a lower level as "High level". Firstly, at the time T1 shown in FIG. 5A, the PD unit 1 holds a signal charge and both the gate of the read transistor 2 and the gate of the reset transistor 3 are at Low level while the VDD power 6 is at High level. At the time T2 shown in FIG. 5B, the FD unit 7 is set to High level of the voltage in the VDD power 6 since the gate of the reset transistor 3 rises to High level. At the time T3 shown in FIG. 5C, the charge held by the PD unit 1 is read out by the FD unit 7 since the read pulse falls to Low level. Here, a signal is retrieved as a change in the electric potential of the vertical signal line 5 resulted from the change in the gate voltage of the detecting transistor 4 due to the change in the electric potential of the FD unit 7. After the VDD power 6 falls to Low level at the time T4 shown in FIG. 5D, the FD unit 7 is set to Low level by the fact that the gate of the reset transistor 3 rises again to High level at the time T5 shown in FIG. 5E. At the time T6 shown in FIG. 5F, the gate of the reset transistor 3 is at Low level. At the time T7 shown in FIG. 5G, the VDD power 6 rises again to High level in order to detect a signal of the (N+1) th row. Similarly, at the time T8 through T14, the same operation as performed at the time T1 through T7 on the pixels in the N th row is repeated for the pixels in the (N+1) th row.

However, the existing technique might cause the error which will be explained below.

Figure 5A:
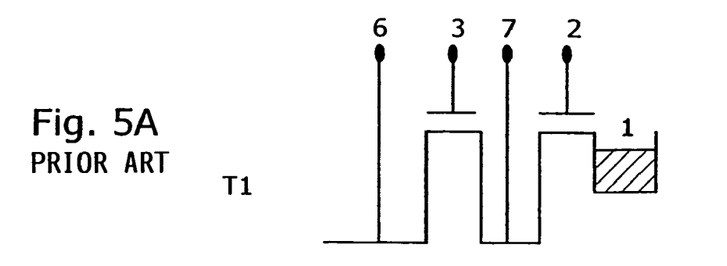
Figure 5B:
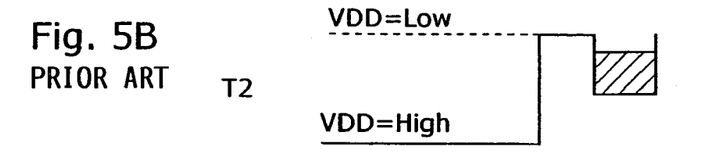
Figure 5C:
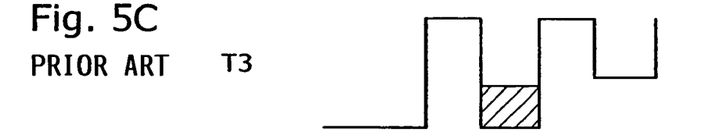
Figure 5D:
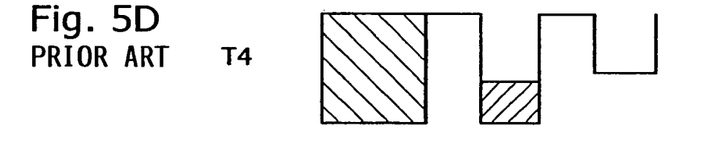
Figure 5E:
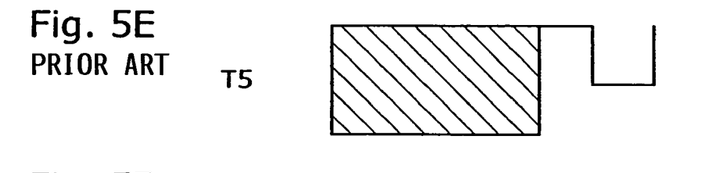
Figure 5F:
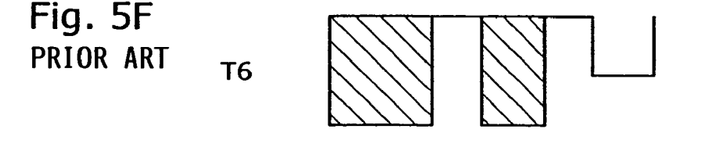
Figure 5G:
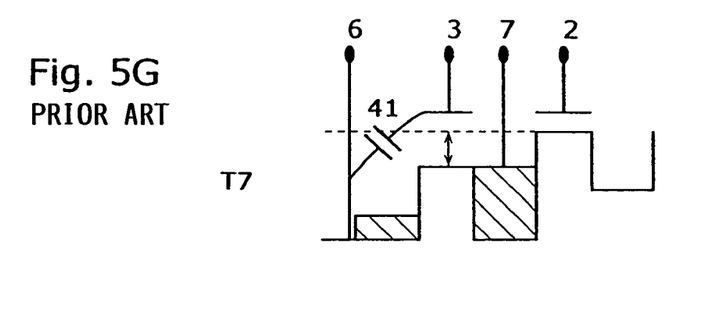

At the time T7 shown in FIG. 5G as described above, the voltage changes rapidly when the VDD power 6 rises again to High level. At the same time, the gate voltage of the reset transistor 3 fluctuates to have a positive potential due to the coupling capacitance 41 between the VDD power 6 and the gate of the reset transistor 3. Therefore, the gate of the reset transistor 3 opens and a part of the electrons held in the FD unit 7 flows over to the side of the VDD power 6 so that the electric potential of the FD unit 7 becomes positive. Due to the change in the electric potential of the FD unit 7, the gate voltage of the detecting transistor 4 becomes positive and the detecting transistor 4 that is normally off is switched on. As a result, an error that the charge detected in the selectable row is affected by the selection of the non-selectable row is generated. Thus, a proper charge signal can not be obtained, and an error, for example, of not detecting a bright light, might be caused.

SUMMARY OF THE INVENTION

An object of the present invention is to provide the MOS-type solid-state imaging device, having a circuit for determining selectable and non-selectable rows based on the voltage of the VDD power, which prevents the error of selecting a non-selectable row.

In order to achieve the above object, the solid-state imaging device according to the present invention is a MOS-type solid-state imaging device that is formed on a semiconductor substrate, comprising: a plurality of unit pixels, each including: an accumulation unit operable to perform photoelectric conversion on an incident light and accumulate a signal charge obtained as a result of the photoelectric conversion; and a resetting unit having a MOS transistor, operable to reset, according to a reset signal, the signal charge accumulated by the accumulation unit; and a power supply unit operable to supply the resetting unit with a voltage to be applied as a reset voltage, wherein the power supply unit controls charge and discharge of the signal charge by adding a predetermined amount of time to a period during which a gradient is generated when the supply voltage changes from a non-detectable electric potential to a detectable electric potential, the signal charge being generated by a coupling capacitance and accumulated by the accumulation unit.

Thus, it is possible, by extending the period in which the voltage of the VDD power rises from a non-detectable electric potential (Low level) to a detectable electric potential (High level), to prevent the gate voltage of the resetting unit from fluctuating to have a positive potential due to the coupling capacitance between the VDD power and the resetting unit. This finally leads to the prevention of the error of selecting a non-selectable row.

It should be noted that the present invention can be realized not only as the solid-state imaging device described above, but also as a power supply method to be employed by the solid-state imaging device.

According to the present invention, it is possible, by extending the period during which the voltage of the VDD power rises from Low level to High level, that the gate voltage of the resetting unit does not fluctuate to have a positive electric potential due to the coupling capacitance between the VDD power and the gate of the resetting unit, unlike the case of using the existing technique. Therefore, the electrons for allowing the accumulation unit to be non-selectable do not flow from the accumulation unit to the VDD power, which prevents the level of the electric potential held by the accumulation unit of the non-selectable row from becoming positive. Also, the detecting unit is not switched on, which prevents the error of selecting a non-selectable row.

It should be noted that the present invention describes the case of utilizing n-type MOS transistors for resetting, reading and detecting units. The present invention can be effectively applied to the case of using p-type MOS transistors for the respective units.

It is also possible to realize a camera with an excellent performance but without errors, by applying the solid-state imaging device of the present invention to the camera. The practical value is therefore extremely high.

FURTHER INFORMATION ABOUT TECHNICAL BACKGROUND TO THIS APPLICATION

The disclosure of Japanese Patent Application No. 2003-282983 filed on Jul. 30, 2003, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

The following describes the embodiments of the present invention with reference to the drawings.

First Embodiment

Figure 6:
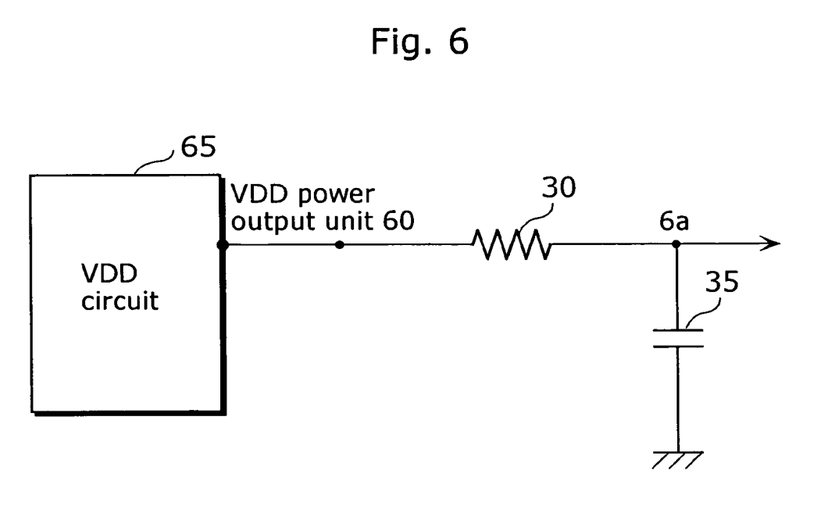
FIG. 6 is a diagram showing the circuit in the output unit of the VDD circuit in the solid-state imaging device according to a first embodiment of the present invention.

The structure of the solid-state imaging device 122 (not shown in the diagram) according to the first embodiment of the present invention has a structure as same as that of the conventional solid-state imaging device, except that the former has a position 60a instead of the VDD power output unit 60 (in FIG. 6 which will be mentioned later) that is a position for supplying power as the VDD power 6 in the conventional technique shown in FIGS. 1, 2 and 3 above. FIG. 6 describes in detail the position 60a for supplying VDD power.

FIG. 6 is a diagram showing the circuit of the output unit in the VDD circuit 65 in the solid-state imaging device 122 according to the first embodiment of the present invention. When a resistance 30 is connected in series to the position after the VDD power output unit 60, it is possible to slow down the change in rising or falling period of the VDD pulse in the position 60a that is set after the resistance 30, due to the capacitor 35 connected to the position 60a. Assume here that the position 60a that is set after the resistance 30 is the position for supplying power in the solid-state imaging device 122 shown in FIG. 1.

Figure 7:
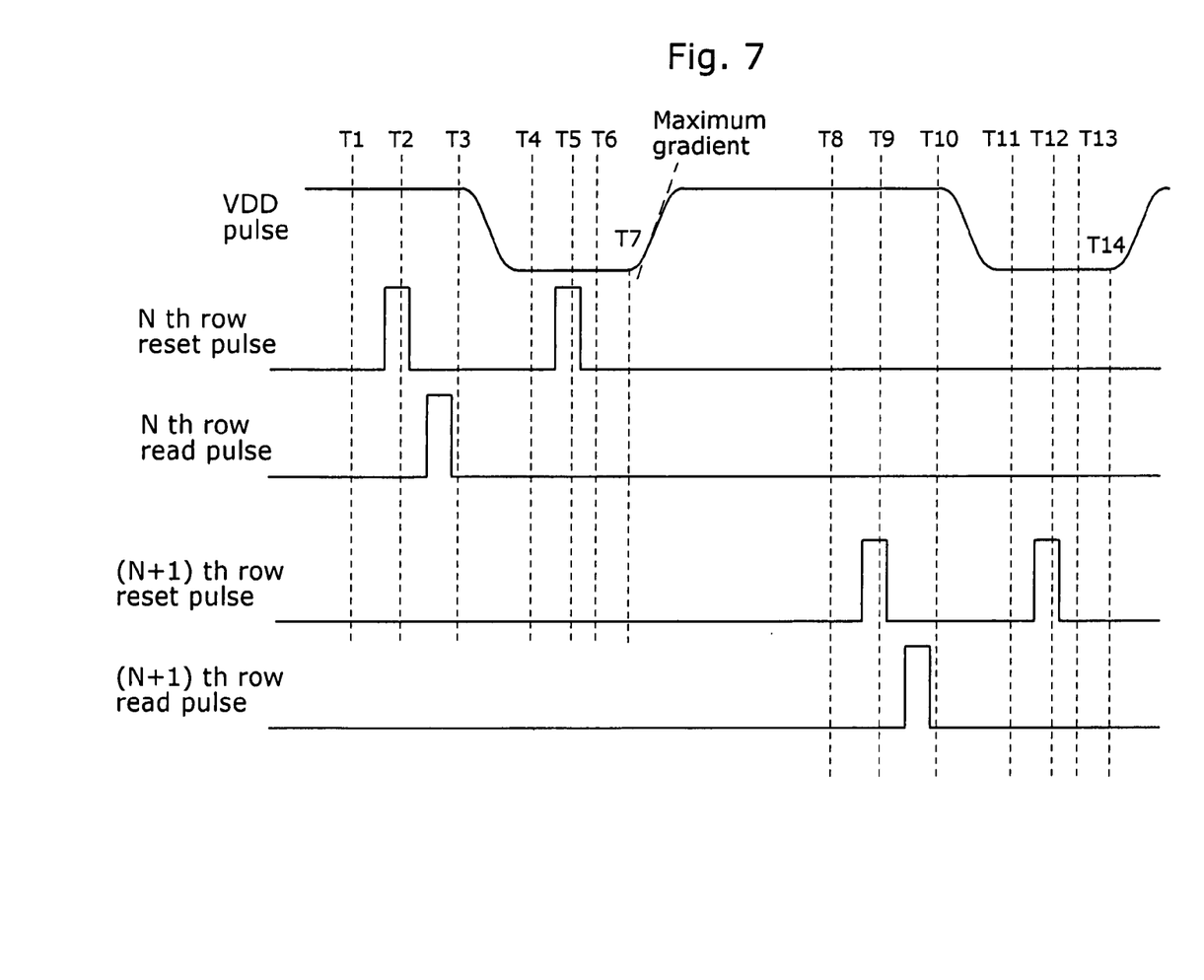
FIG. 7 is a diagram showing the drive timing of the pixel unit in the solid-state imaging device according to the first embodiment of the present invention.

FIG. 7 is a diagram showing the drive timing of the pixel unit 14 in the solid-state imaging device according to the first embodiment of the present invention. The difference between the present and the existing apparatuses is that the former has the longer rising or falling period (namely, the VDD pulse rises and falls slowly). As shown in FIG. 6, by setting the position for supplying VDD power to the position 60a, the gradient of the waveform during the rising or falling period of the VDD pulse between the time T3 and the time T4, between the time T7 and the time T8, and between the time T10 and the time T11 is less sharp than the one generated, as shown in FIG. 4, using the conventional solid-state imaging device (i.e., a certain amount of time is added to a period during which a gradient is generated when the supply voltage changes from a non-detectable electric potential to a detectable electric potential.)

Figure 8:
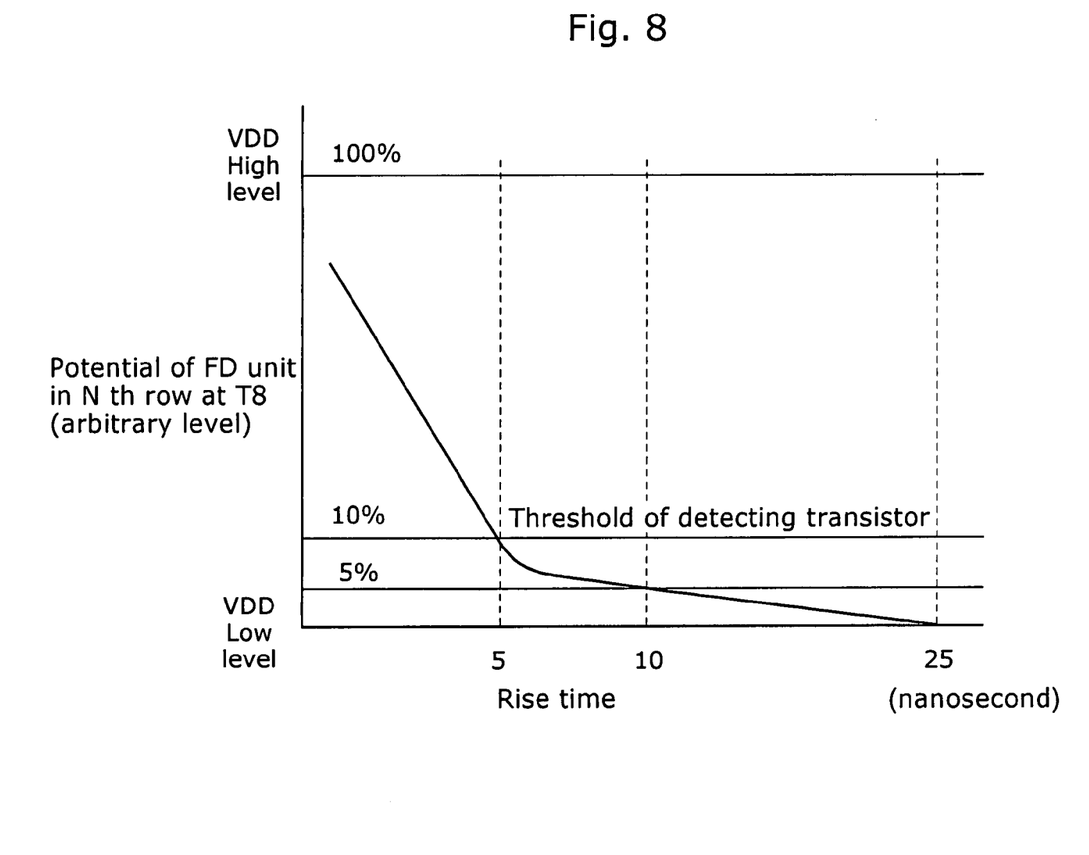
FIG. 8 is a diagram showing the electric potential held by the FD unit at the rise time of the VDD power in the solid-state imaging device according to the first embodiment of the present invention.

FIG. 8 is a diagram showing the relationship between "rise time of the VDD power" and "potential of FD unit" of the solid-state imaging device 122 according to the first embodiment of the present invention. In the case where the rise time of the VDD power requires 5 nanoseconds, the electric potential of the FD unit 7 amounts to 10% of the amplitude of the VDD power, that is, less than or equal to the threshold of the detecting transistor 4. This indicates that the operation of the detecting transistor 4 is stable. In the case where the rise time of the VDD power requires 10 nanoseconds, the electric potential of the FD unit 7 amounts to 5% of the amplitude of the VDD power. Here, it is possible to have a margin for the threshold of the detecting transistor 4. In the case where the rise time requires 25 nanoseconds, the electric potential of the FD unit 7 is reduced to Low level of the VDD power. This indicates that the operation of the detecting transistor 4 connected to the FD unit 7 is completely stable. Therefore, it is preferable that the rise time of the VDD power requires 5 nanoseconds and above.

Figure 9:
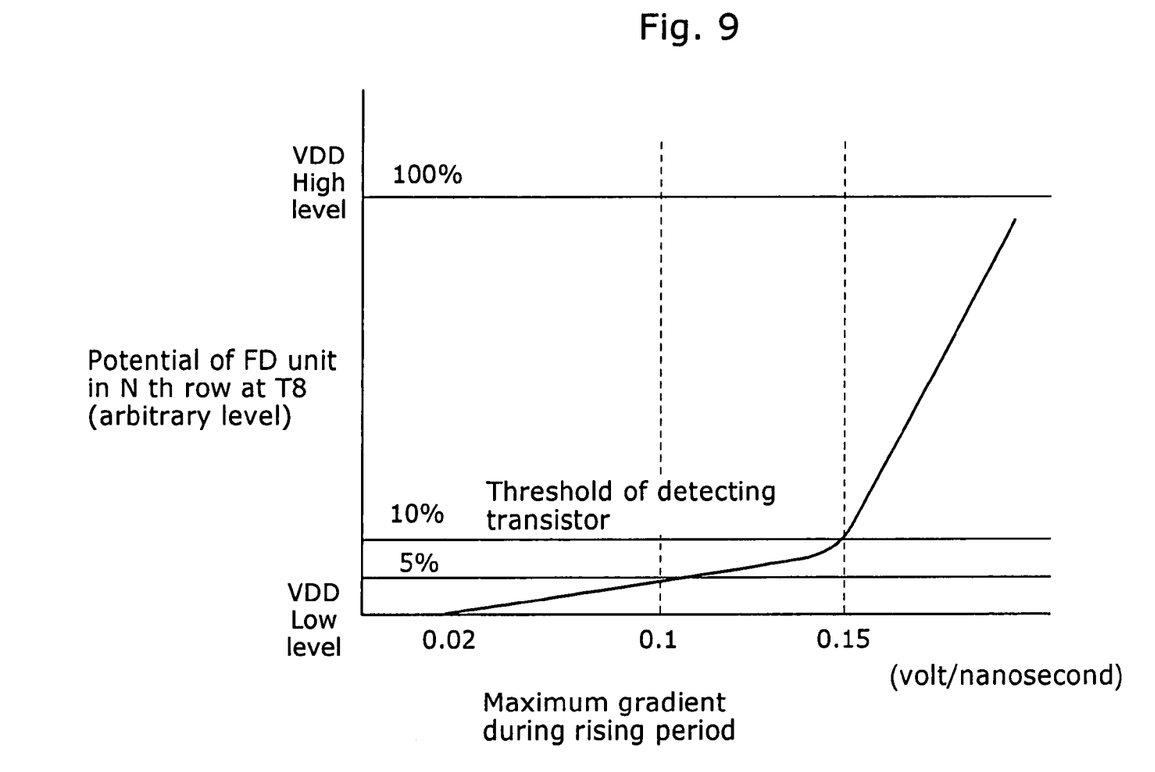
FIG. 9 is a diagram showing the electric potential held by the FD unit for the maximum gradient during the rising period of the VDD power in the solid-state imaging device according to the first embodiment of the present invention.
Figure 10A:
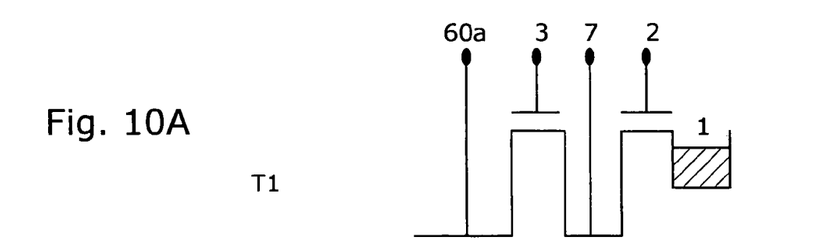
FIGS. 10A-10G show the electric potential at the time T1 through T7 at each part of the pixel unit in the solid-state imaging device according to the first embodiment of the present invention.
Figure 10B:
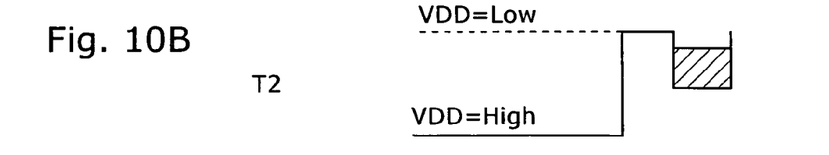
Figure 10C:
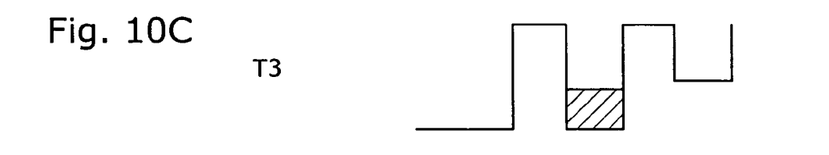
Figure 10D:
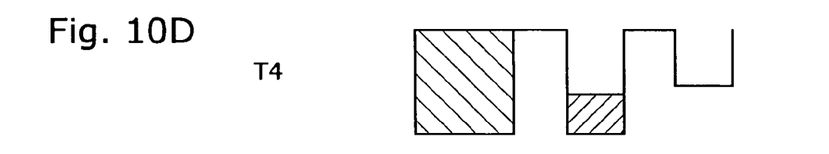
Figure 10E:
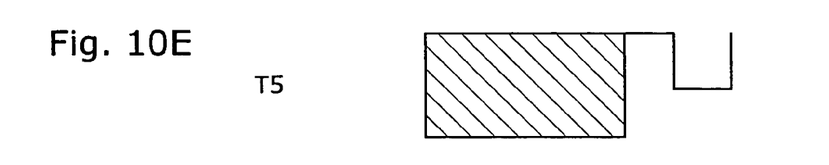
Figure 10F:
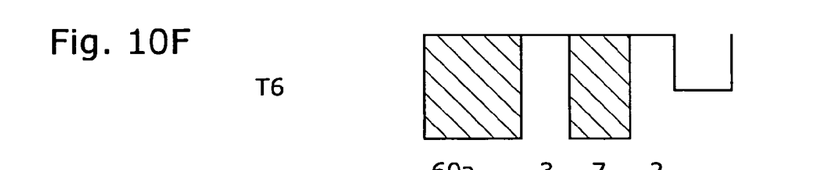
Figure 10G:
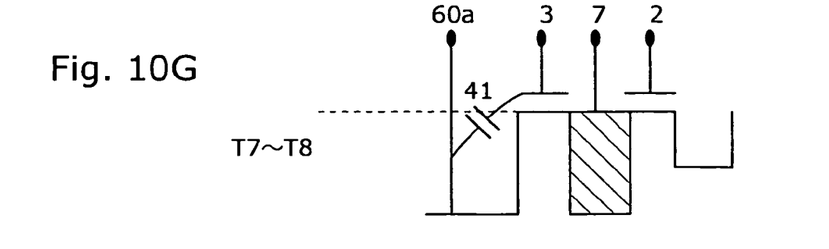

FIG. 9 is a diagram showing the relationship between "maximum gradient during rising period of VDD power" and "potential of FD unit in N th row at T8" of the solid-state imaging device 122 according to the first embodiment of the present invention. In the case where the maximum gradient during the rising period of the VDD power is 0.15 volts per nanosecond, the electric potential of the FD unit 7 in the N th row at the time T8 amounts to 10% of the VDD power, that is, less than or equal to the threshold of the detecting transistor 4. This indicates that the operation of the detecting transistor 4 is stable. In the case where the maximum gradient is 0.1 volts per nanosecond, the electric potential amounts to 5% of the amplitude of the VDD power so that it is possible to have a margin for the threshold of the detecting transistor 4. In the case where the maximum gradient is 0.02 volts per nanosecond, the electric potential of the FD unit 7 can be reduced to Low level of the VDD power. This indicates that the operation of the detecting transistor 4 connected to the FD unit 7 is completely stable. Therefore, it is preferable that the maximum gradient during the rising period of the VDD power is 0.15 volts and below per nanosecond.

It should be noted that desired values can be set for the "VDD rise time" shown in FIG. 8 and the "maximum gradient during rising period of VDD power" shown in FIG. 9 by adjusting the value of the resistance 30 in FIG. 6.

FIG. 10 is a diagram showing the electric potential at each time at each unit in the pixel unit 14 of the solid-state imaging device 122 according to the first embodiment of the present invention. FIGS. 10A-10F are as same as FIGS. 5A-5F of the existing technique. As shown in FIG. 10G, however, by slowing down the transition of the VDD pulse from Low level (to be also referred to as "non-detectable electric potential") to High level (to be also referred to as "detectable electric potential") during the rising period of the VDD pulse between the time T7 and the time T8, even in the case where the coupling capacitance 41 exists between the VDD power 6 and the gate of the reset transistor 3, the gate voltage of the reset transistor 3 does not fluctuate to have a positive electric potential during the period in which the voltage in the position 60a rises from Low level to High level. Therefore, it is possible to prevent the error that the electrons partly flow to the side of the VDD power, which has been caused by the existing technique. Thus, it is possible to set the voltage of the position 60a to Low level so that the FD unit 7 becomes stable. It is therefore possible to prevent the error of allowing the FD unit 7 that is normally non-selectable to be selectable due to the high electric potential caused by the fact that the gate voltage of the detecting transistor 4 comes to have a positive electric potential.

As described above, according to the solid-state imaging device of the present embodiment, it is possible to prevent the error of selecting a non-selectable row by mistake.

Second Embodiment

Figure 11:
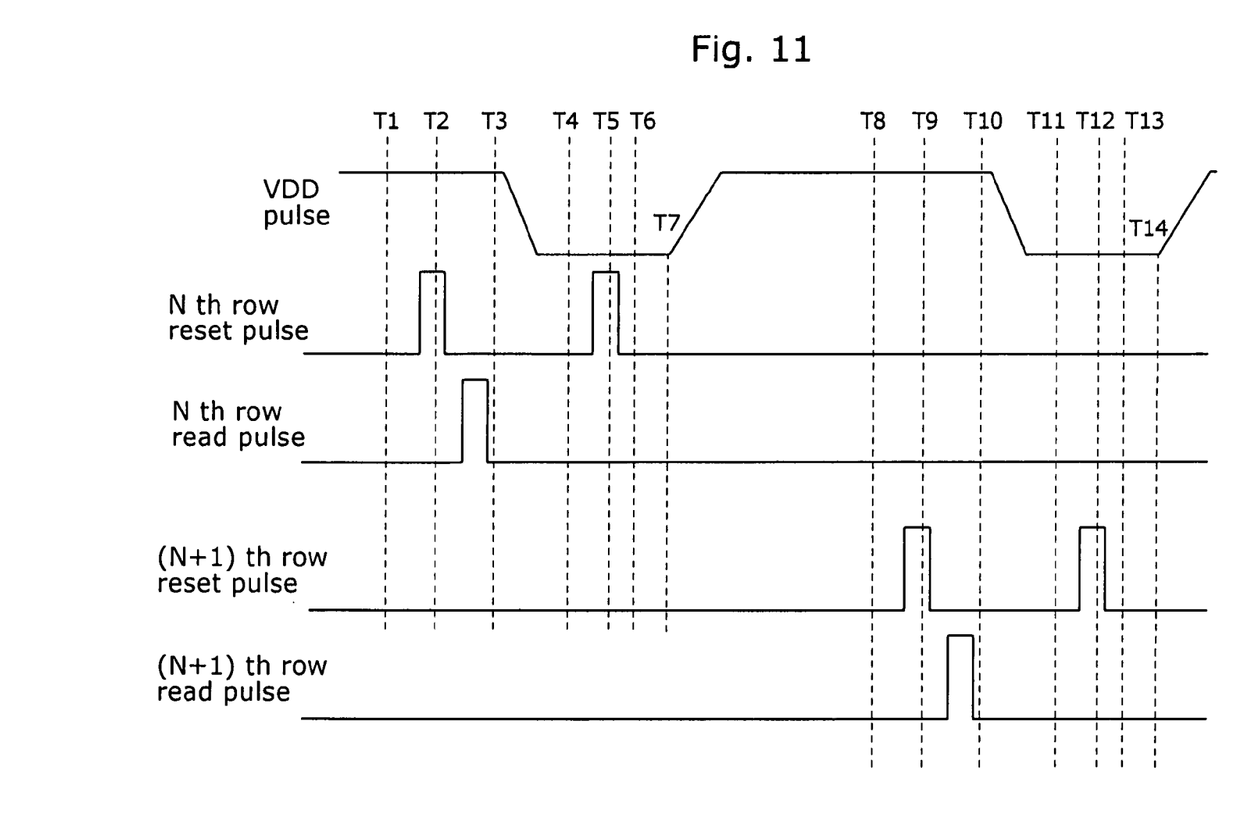
FIG. 11 is a diagram showing the drive timing of the pixel unit in the solid-state imaging device according to a second embodiment of the present invention.

FIG. 11 is a diagram showing the drive timing of the pixel unit 14 in the solid-state imaging device 222 (not shown in the diagram) according to the second embodiment of the present invention. The difference between the present apparatus and the apparatus according to the first embodiment shown in FIG. 7 is that a ramp wave is used for the waveform generated during the rising or falling period of the VDD pulse. It should be noted that the ramp wave in this case can be easily formed by employing a ramp generator. The gradient generated when the VDD pulse rises during the period between the time T7 and the time T8 shown in FIG. 11 greatly influences the change in the electric potential of the FD unit 7. The gate potential of the detecting transistor 4 connected to the FD unit 7 is made completely stable as a non-detectable electric potential by providing the ramp wave whose period of transition from Low level to High level is longer than 5 nanoseconds or the ramp wave whose time differentiation for the period of transition from Low level to High level is 0.15 volts and above per nanosecond. In the case where the ramp wave is used for the falling period as well as the rising period, it is possible to employ the same ramp generator for the both periods so that the efficiency in the circuit can be achieved.

Third Embodiment

The difference between the solid-sate imaging device 322 (not shown in the diagram) according to the present embodiment and the solid-state imaging device 122 according to the first embodiment lies in the circuit of the output unit in the VDD circuit 65.

Figure 12:
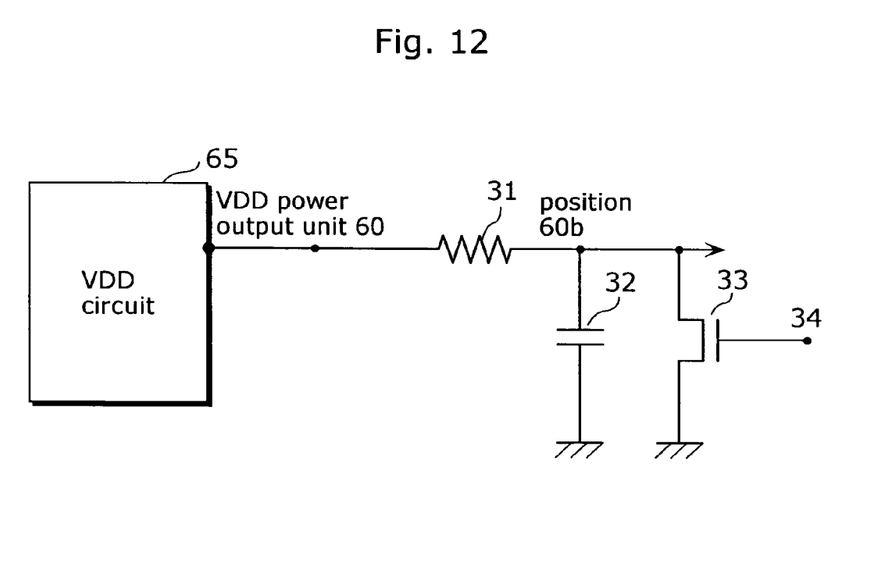
FIG. 12 is a diagram showing the circuit in the output unit of the VDD circuit in the solid-state imaging device according to a third embodiment of the present invention.

FIG. 12 is a diagram showing the circuit of the output unit in the VDD circuit 65 of the solid-state imaging device 322 according to the present embodiment. The resistance 31 is connected in series to the VDD power output unit 60 of the VDD power while the capacitor 32 and the VDD pulse reset transistor 33 are connected, as shown in FIG. 12, in the position 60b that is set after the resistance 31. With the capacitor 32 connected to the position 60b, it is possible to slow down the change of the VDD pulse in the position 60*b* that is set after the resistance 31, when the VDD pulse rises, by switching off the VDD pulse reset input unit 34 connected to the gate of the VDD pulse reset transistor 33. It is also possible to realize a precipitous fall because the charge accumulated in the capacitor 32 can be rapidly reduced to Low level by switching on the VDD pulse reset input unit 34 at the edge of falling. The position 60*b* after the resistance 31 is set as a position for supplying power, instead of the VDD power output unit 60 in the solid-state imaging device 22 shown in FIG. 1.

Figure 13:
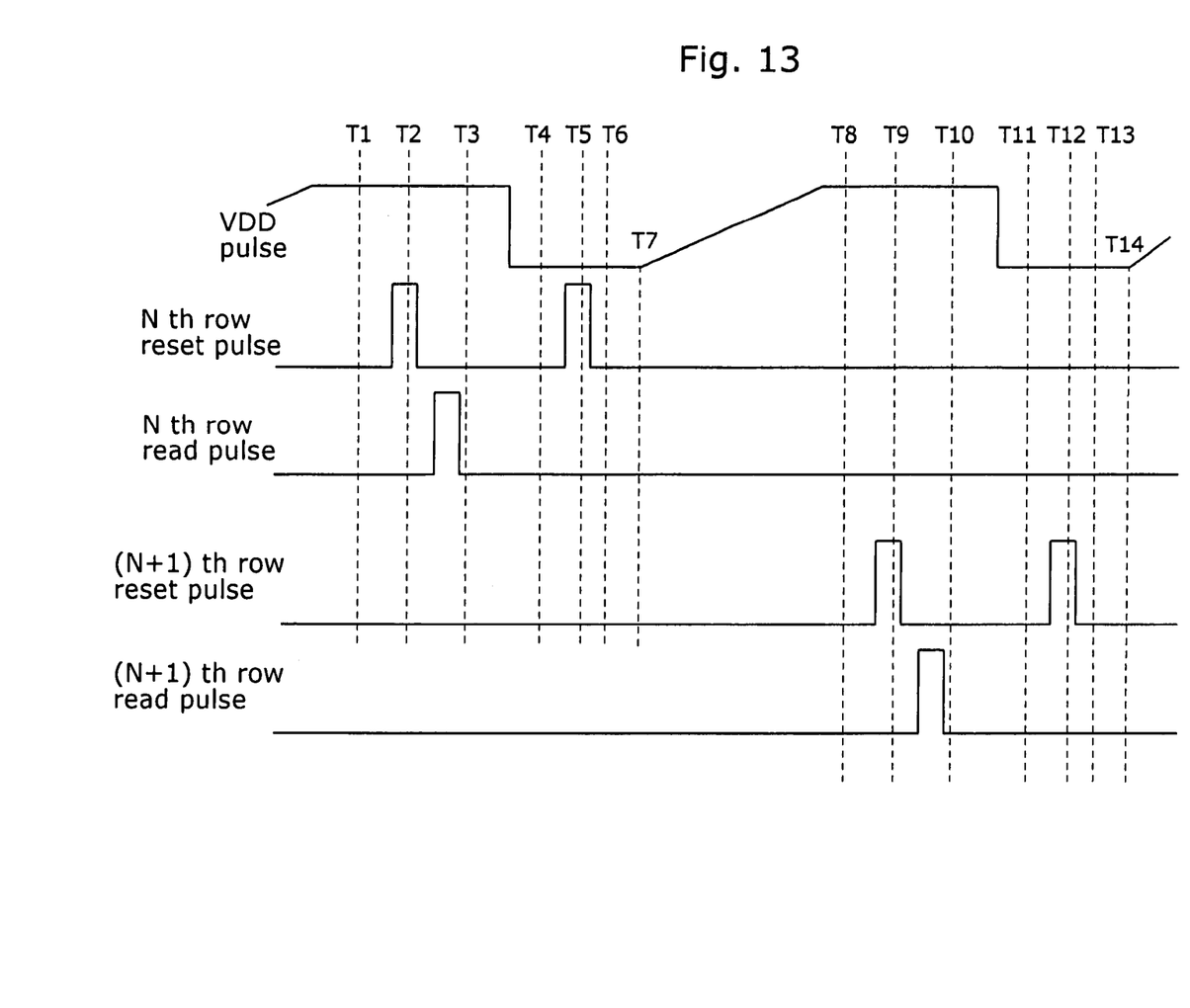
FIG. 13 is a diagram showing the drive timing of the pixel unit in the solid-state imaging device according to the third embodiment of the present invention.

FIG. 13 is a diagram showing the drive timing of the pixel unit 14 in the solid-state imaging device according to the third embodiment of the present invention. As shown in FIG. 13, the ramp wave is used only when the VDD pulse rises during the period between the time T7 and the time T8 in the case of using the present solid-state imaging device 322. Although the voltage rapidly changes during the falling period, no errors are caused in the solid-state imaging device 322. It is therefore possible to shorten the total driving time by making the falling period precipitous between the time T10 and the time T11. The voltage of the FD unit 7 is also stabilized since the gradient forming the ramp wave which rises during the rising period between the time T7 and the time T8 can be reduced. Consequently, the gate voltage of the detecting transistor 4 connected to the FD unit 7 is thoroughly stabilized as a non-detectable electric potential.

Fourth Embodiment

Figure 14:
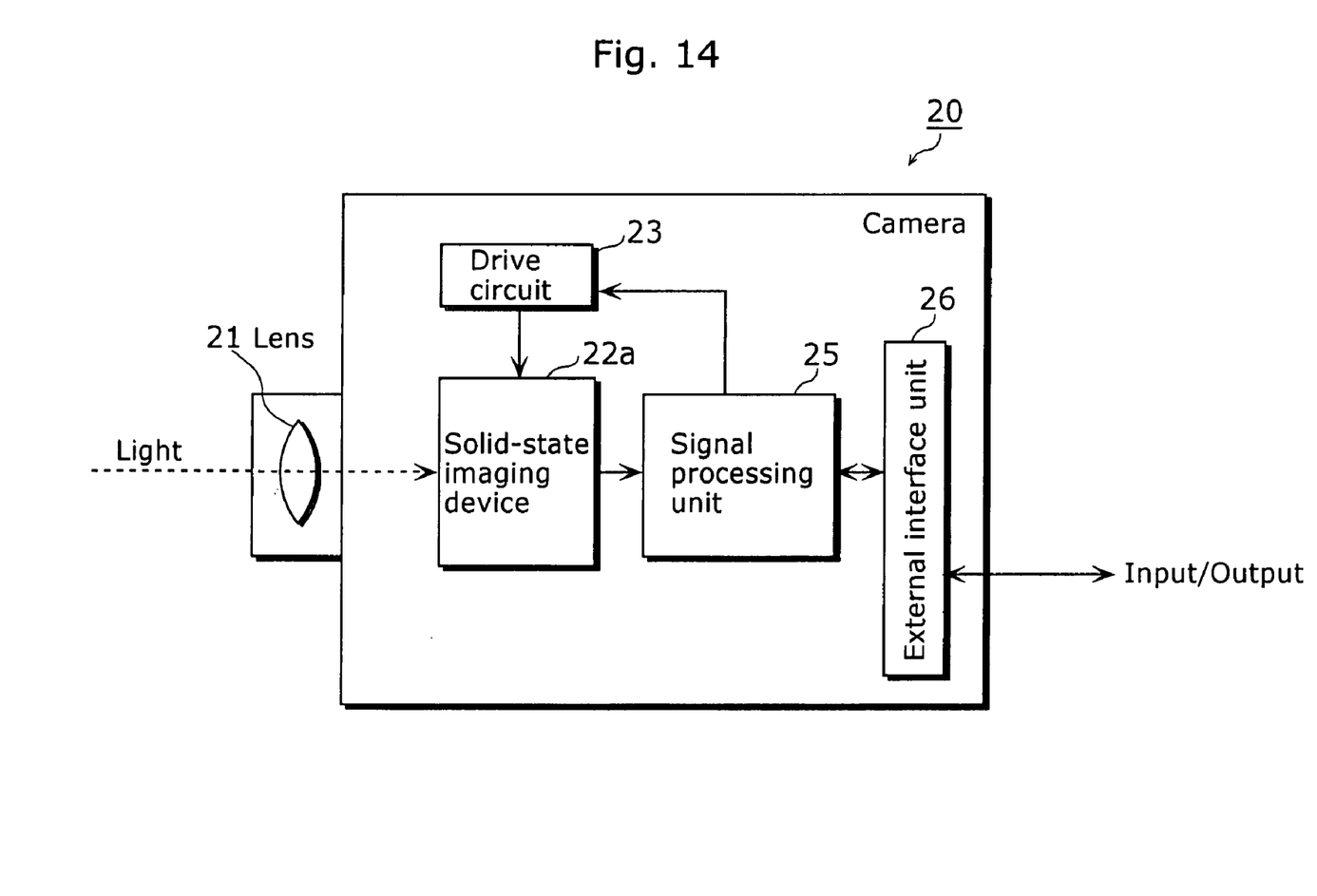
FIG. 14 is a block diagram showing the camera according to a fourth embodiment of the present invention.

FIG. 14 is a block diagram in the case of using, for a camera, one of the solid-state imaging devices 122, 222 and 322 (to be referred to as "22*a*" hereinafter for convenience) according to the embodiments described so far. A camera 20 includes a lens 21, a solid-state imaging device 22*a*, a drive circuit 23, a signal processing unit 25 and an external interface unit 26. The light that passed through the lens 21 enters the solid-state imaging device 22*a*. The signal processing unit 25 drives the solid-state imaging device 22*a* via the drive circuit 23, and extracts an output signal outputted from the solid-state imaging device 22*a*. The signal processed by the signal processing unit 25 is outputted outside via the external interface unit 26. The camera without the error of selecting a non-selectable row can be realized by using one of the solid-state imaging devices 122, 222 and 322, according to the first through third embodiments of the present invention.

Thus, the solid-state imaging device and the camera according to the present invention are described based on the embodiments, however, the present invention is not limited to these embodiments. For example, the present invention describes the case of using n-type MOS transistors respectively for reset, read and detecting transistors, but p-type MOS transistors can be applied to the respective transistors instead. However, the polarity of each signal is reversed in this case so that the attention shall be drawn to the part where the description is provided for the change in voltage levels. That is to say, the phrase "the period in which the voltage of the VDD power rises from Low level to High level" shall be read as "the period in which the voltage of the VDD power falls from High level to Low level".

It should be noted that a different circuit may be used for realizing less precipitous rise and fall of the VDD pulse instead of the circuit described in the embodiments.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The solid-state imaging device according to the present invention is effective in preventing the error of mistakenly selecting a non-selectable row at the time when selectable and non-selectable rows are determined by the VDD power. Such solid-state imaging device is useful as the MOS-type solid-state imaging device used for a cell phone, a digital camera, or the like.

What is claimed is:

1. A MOS-type solid-state imaging device that is formed on a semiconductor substrate, comprising:
   a plurality of unit pixels, each including: an accumulation unit operable to perform photoelectric conversion on an incident light and accumulate a signal charge obtained as a result of the photoelectric conversion; and a resetting unit having a MOS transistor, operable to reset, according to a reset signal, the signal charge accumulated by the accumulation unit; and
   a power supply unit operable to supply the resetting unit with a voltage to be applied as a reset voltage,
   wherein the power supply unit controls charge and discharge of the signal charge by adding a predetermined amount of time to a period during which a gradient is generated when the supply voltage changes from a non-detectable electric potential to a detectable electric potential, the signal charge being generated by a coupling capacitance and accumulated by the accumulation unit.

2. The solid-state imaging device according to claim 1, wherein the coupling capacitance is a capacitance between a gate of the MOS transistor and the supply voltage.

3. The solid-state imaging device according to claim 1, wherein the gradient during said period includes a gradient part of a ramp wave pattern.

4. The solid-state imaging device according to claim 1, wherein a time required for the supply voltage to change from the non-detectable electric potential to the detectable electric potential during said period is longer than a time required for the supply voltage to change from the detectable electric potential to the non-detectable electric potential.

5. The solid-state imaging device according to claim 1, wherein a time required for the supply voltage to change from the non-detectable electric potential to the detectable electric potential during said period is longer than 5 nanoseconds.

6. The solid-state imaging device according to claim 1 wherein the gradient during said period is smaller than 0.15 volts per nanosecond.

7. The solid-state imaging device according to claim 1, wherein the power supply unit supplies all of said plurality of unit pixels with the supply voltage.

8. A camera comprising a MOS-type solid-state imaging device that is formed on a semiconductor substrate,
   wherein the solid-state imaging device includes:
   a plurality of unit pixels, each having: an accumulation unit operable to perform photoelectric conversion on an incident light and accumulate a signal charge obtained as a result of the photoelectric conversion; and a resetting unit having a MOS transistor, operable to reset, according to a reset signal, the signal charge accumulated by the accumulation unit; and a power supply unit operable to supply the resetting unit with a voltage to be applied as a reset voltage, and the power supply unit controls charge and discharge of the signal charge by adding a predetermined amount of time to a period during which a gradient is generated when the supply voltage changes from a non-detectable electric potential to a detectable electric potential, the signal charge being generated by a coupling capacitance and accumulated by the accumulation unit.

9. A power supply device for supplying, with a supply voltage, a plurality of MOS-type unit pixels formed on a semiconductor substrate, wherein each of said unit pixels includes:

an accumulation unit operable to perform photoelectric conversion on an incident light and accumulate a signal charge obtained as a result of the photoelectric conversion, and a resetting unit having a MOS transistor, operable to reset, according to a reset signal, the signal charge accumulated by the accumulation unit, and the power supply device controls charge and discharge of the signal charge by adding a predetermined amount of time to a period during which a gradient is generated when the supply voltage changes from a non-detectable electric potential to a detectable electric potential, the signal charge being generated by a coupling capacitance and accumulated by the accumulation unit.

10. A power supply method for supplying, with a supply voltage, a plurality of MOS-type unit pixels formed on a semiconductor substrate, wherein each of said unit pixels includes:

an accumulation unit operable to perform photoelectric conversion on an incident light and accumulate a signal charge obtained as a result of the photoelectric conversion; and a resetting unit having a MOS transistor, operable to reset, according to a reset signal, the signal charge accumulated by the accumulation unit, and in the power supply method, charge and discharge of the signal charge is controlled by adding a predetermined amount of time to a period during which a gradient is generated when the supply voltage changes from a non-detectable electric potential to a detectable electric potential, the signal charge being generated by a coupling capacitance and accumulated by the accumulation unit.

11. The solid-state imaging device according to claim 2, wherein the gradient during said period includes a gradient part of a ramp wave pattern.

12. The solid-state imaging device according to claim 2, wherein a time required for the supply voltage to change from the non-detectable electric potential to the detectable electric potential during said period is longer than a time required for the supply voltage to change from the detectable electric potential to the non-detectable electric potential.

13. The solid-state imaging device according to claim 2, wherein a time required for the supply voltage to change from the non-detectable electric potential to the detectable electric potential during said period is longer than 5 nanoseconds.

14. The solid-state imaging device according to claim 2, wherein the gradient during said period is smaller than 0.15 volts per nanosecond.

15. The solid-state imaging device according to claim 2, wherein the power supply unit supplies all of said plurality of unit pixels with the supply voltage.

* * * * *